Patented June 27, 1944

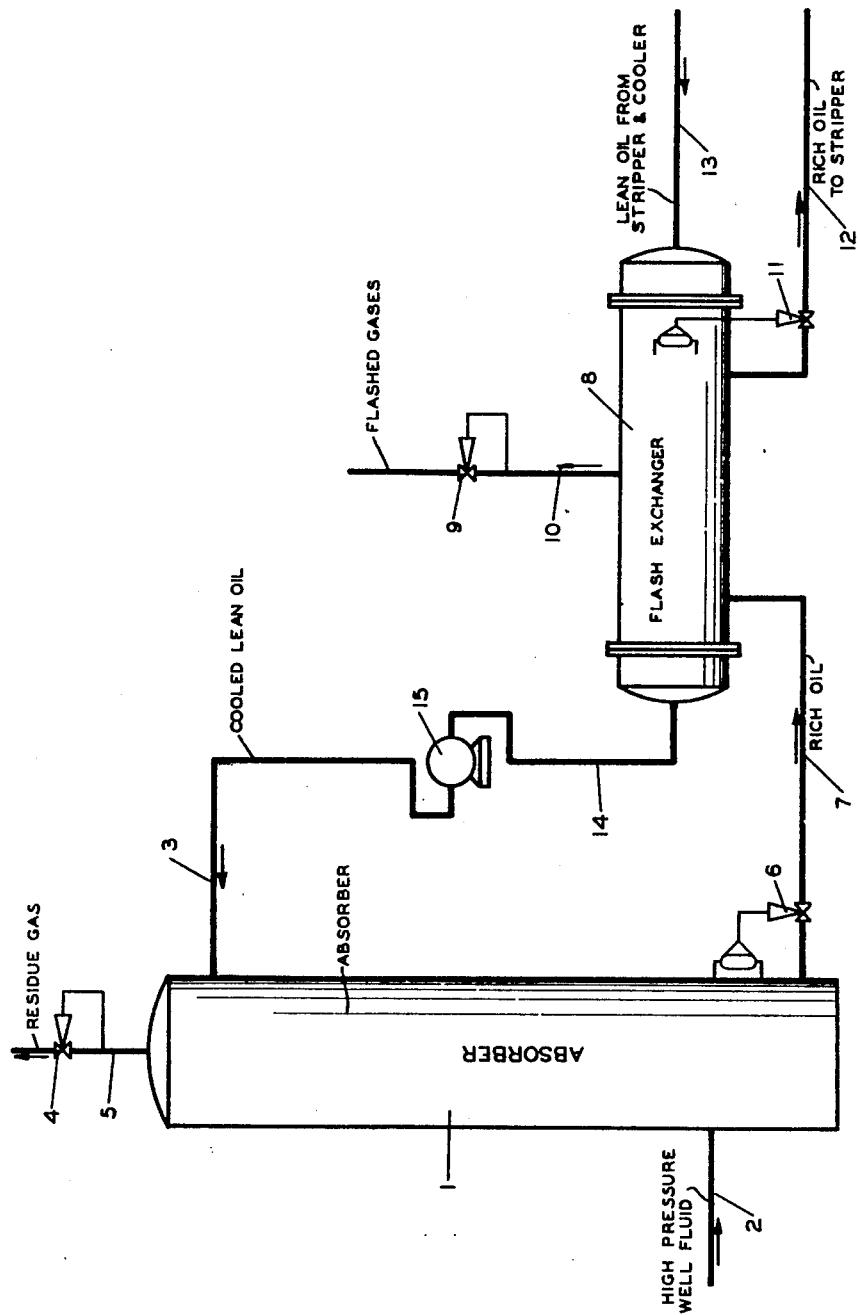

2,352,295

UNITED STATES PATENT OFFICE 2,352,295

ABSORPTION PROCESS

William Swerdloff, Bartlesville, Okla., assignor to Phillips Petroleum Company, a corporation of Delaware Application September 17, 1940, Serial No. 357,176

1 Claim. (Cl. 196—8)

The present invention relates to the recovery of desirable components from a mixture of gases by absorption.

The quantity of desirable components that may be absorbed from a mixture of gases by a given quantity of absorbent depends upon the temperature and pressure at which the absorption is carried out. It is well known that the capacity of the absorbent increases with an increase in the operating pressure or with a decrease in the operating temperature. Heat of condensation or heat of absorption released in the absorber tends to increase the operating temperature and decrease the capacity of the absorbent. Various methods have been proposed for cooling the absorber or the denuded absorbent to prevent or compensate for this temperature rise. The extent to which the lean absorbent may be cooled has heretofore been restricted economically. In general the increase in the absorption capacity of the oil does not warrant the additional expense of artificial refrigeration. Therefore, the cooling water temperature usually determines the temperature of the lean absorbent. The present invention provides a method of further reducing the temperature of the lean absorbent which is especially applicable to plants operating with high absorber pressures.

At the present time there is considerable production from high pressure gas wells known to the petroleum industry as "distillate" or "condensate" type wells. Present practice in producing wells of this type is to recover the heavier components from the well fluid by absorption or condensation methods at high pressures and return the residue gas to the producing formation through suitable input wells. This operation is known to the industry as recycling. Well injection pressures at the input wells are necessarily higher than the well head pressure of the producing well when the gas is being returned to the same producing formation. Often these pressures are much higher than those at which absorption processes are usually carried out. Therefore it is necessary to reduce the pressure for the absorption step and use compressors to raise the pressure of the residue gas from the operating pressure of the recovery plant to the injection pressure. The high cost of compressor installations makes it desirable that the recovery be carried out at a pressure as high as economically possible to minimize compression costs.

High pressure absorption processes have been recently developed for use in these operations in which the absorbers are operated at 1200 to 1500 pounds per square inch. Formerly it was thought to be impossible to operate absorbers at high pressures (over 1000 pounds per square inch) for absorption of a complex hydrocarbon mixture with absorption oil because of the loss of the absorption oil due to its increased volatility and the increased density of the gas at high pressures. It is now known that by proper choice of the absorbent and by control of the operating temperature even higher absorption pressures may be used. The phenomenon of increased volatility of the absorption oil at high pressures may be avoided by operating the absorbers at temperatures below the critical temperature of the mixture of gas and absorbent in the absorber. The present invention is particularly applicable for use with these high pressure absorption processes and offers an economical means of cooling the absorbers to within desirable operating temperatures without expensive artificial refrigeration. By use of this invention in recycling operations, the absorption pressure may be increased, thus decreasing the costs of the compressor installation.

An object of this invention is to provide a means of cooling the lean absorbent in an absorption process.

Another object is to provide a means of cooling lean absorbent, which is especially applicable to high pressure absorption.

A large part of the volatile components which are absorbed in an absorbent at high pressures are released from the absorbent at lower pressures. When these components are released from the absorbent, they remove from the absorbent and the surroundings a quantity of heat equivalent to the latent heat of condensation or heat of absorption at the absorbent temperature. This tends to reduce the temperature of the absorbent and to utilize any heat available from the surroundings. The quantity of heat removed from the absorbent and surroundings by flashing a volume of rich absorbent depends upon the amount and nature of the absorbed components released at the flashing temperature. It is apparent that, within practical limits, the quantity of heat which may be removed from the surroundings by the absorbent during the flashing is increased with increased pressure or decreased temperature in the absorption step. The present invention proposes to utilize the refrigerating effect accompanying flashing to remove sensible heat from the lean absorbent. This is accomplished by flashing the rich absorbent in heat exchange relationship with the lean absorbent.

It is evident that this process may be used with relatively low pressure absorption equipment, but is more effective when used with high pressure absorption processes.

Apparatus suitable for carrying out the present invention is shown in the accompanying drawing which is a diagrammatic elevation view.

With reference to the drawing the numeral 1 designates an absorber in which the gas from the high pressure condensate wells is contacted with a suitable absorbent. A relatively heavy paraffin neutral oil having a low cold test is an example of a suitable absorbent. Preferably the absorbent is one having an initial boiling point greater than the boiling point of the heaviest component that is to be absorbed. The fluid from the high pressure wells enters the base of the absorber 1 through the pipe 2 and is brought into intimate counter-current contact with the cold lean absorbent which enters the top of the absorber through the pipe 3. Preferably the absorber is a bubble tower. The absorbent flowing down over the bubble plates contacts the gas rising through perforations in the plates and absorbs all but the most volatile components from the gas stream. Residue gas, consisting chiefly of inert gases, methane, ethane, and small percentages of heavier components, passes off the top of the absorber through the back pressure regulator 4 and the pipe 5. In recycle operations this residue gas is compressed and returned to the producing formation at suitable injection points known as input wells.

Enriched absorbent containing the components extracted from the well fluid is withdrawn through a float controlled valve 6 and passed through the pipe 7 to a heat exchanger 8 where flashing occurs. The heat exchanger is maintained at a low pressure relative to that of the absorber. The back pressure regulator 9 maintains the desired pressure on the absorbent in the heat exchanger. A shell and tube type heat exchanger with the rich absorbent in the shell has been found to give good results. Absorbed components are released in the heat exchanger where they are flashed off and removed as gases or vapors through the back pressure regulator 9 and the pipe 10. These gases may be passed to a vapor recovery system not shown in the drawing. The flashing operation requires heat equivalent to the latent heat of vaporization of the flashed components which must be supplied in the heat exchanger. This lowers the temperature of the enriched absorbent and cools the tubes of the heat exchanger. The flashed rich oil is withdrawn through a liquid level controlled valve 11 and the pipe 12, after which it may be further stripped of absorbed components in a conventional manner.

Cool lean absorbent enters the heat exchanger through the pipe 13 which conducts the lean oil from the usual cooling coils in an atmospheric cooling tower or from storage. In the heat exchanger the oil is further cooled by passing in heat exchange relation with the flashed rich oil. In the shell and tube heat exchanger illustrated in the accompanying drawing, the lean absorbent passes through the tubes. From the heat exchanger the cold lean oil passes through the pipe 14 to the pump 15. The pump 15 raises the pressure of the cooled lean absorbent and forces it into the top of the absorber through the pipe 3, thus completing the cycle.

This invention is particularly applicable to high pressure absorption because of the characteristics of the hydrocarbons at high pressures. The heats of absorption of the various components become smaller as the pressure is increased and are very small at high absorption pressures. Thus the heat released in the absorber and the temperature rise of the absorber is relatively low. The flashing step, however, is carried out at much lower pressures where the heats of absorption or conversely the heats of vaporization are higher. This results in sufficient refrigeration to cool the absorbent from the atmospheric cooling coil temperature to a temperature sufficiently low to give good absorption capacity to the lean absorbent and to reduce loss of absorbent by vaporization at the high pressures. The cold absorbent decreases the vaporizing tendency of the absorbent components by maintaining the absorbent at a cool temperature. Cooling of the absorbent becomes more important at pressures above 700–800 pounds per square inch, the region in which increased pressure causes the apparent volatility of the absorbent to increase, rather than decrease, as in the ordinary low pressure region. The present invention increases the pressure at which absorption with a given absorbent may be carried out without artificial refrigeration.

It is evident that the present invention provides an improved process of cooling the lean absorbent in an absorption process and provides a means whereby the efficiency of an absorber may be economically increased.

I claim:

A method for preventing absorption oil carryover in high pressure absorbers comprising the steps of contacting a gaseous hydrocarbon mixture with a cooled lean absorbent oil in a contact zone at a pressure above approximately 700 pounds per square inch and at such a low temperature as to substantially prevent absorption oil carryover whereby the gaseous mixture is effectively absorbed in the lean absorbent oil without substantial rise in the temperature of the oil; passing the thus enriched absorbent oil at essentially absorber temperature into a flashing zone, flashing from said enriched absorption oil at least a portion of the absorbed gaseous hydrocarbons at a pressure sufficiently low to give an optimum cooling effect whereby the enriched absorption oil becomes substantially cooled, passing previously cooled lean stripped absorbent oil in heat exchange relation with the flashing rich absorbent oil whereby the lean absorbent oil becomes further cooled and subsequently passing the further cooled lean absorbent oil into the contact zone at the above said contact zone pressure and at substantially flash exchanger temperature, this temperature being sufficiently low as to prevent appreciable absorbent oil vaporization at said high pressure.

WILL. SWERDLOFF.